United States Patent
Liu et al.

(10) Patent No.: US 10,311,457 B2
(45) Date of Patent: Jun. 4, 2019

(54) COMPUTERIZED METHOD AND SYSTEM FOR AUTOMATING REWARDS TO CUSTOMERS

(71) Applicant: Nanyang Technological University, Singapore (SG)

(72) Inventors: Siyuan Liu, Singapore (SG); Xiaogang Han, Singapore (SG); Zhiqi Shen, Singapore (SG); Chunyan Miao, Singapore (SG)

(73) Assignee: Nanyang Technological University, Singapore (SG)

( * ) Notice: Subject to any disclaimer, the term of this patent is extended or adjusted under 35 U.S.C. 154(b) by 111 days.

(21) Appl. No.: 15/128,885

(22) PCT Filed: Mar. 25, 2015

(86) PCT No.: PCT/SG2015/000093
§ 371 (c)(1),
(2) Date: Sep. 23, 2016

(87) PCT Pub. No.: WO2015/147748
PCT Pub. Date: Oct. 1, 2015

(65) Prior Publication Data
US 2017/0140409 A1    May 18, 2017

Related U.S. Application Data

(60) Provisional application No. 61/970,019, filed on Mar. 25, 2014.

(51) Int. Cl.
*G06Q 30/00* (2012.01)
*G06Q 30/02* (2012.01)
(Continued)

(52) U.S. Cl.
CPC ......... *G06Q 30/0207* (2013.01); *G06F 16/22* (2019.01); *G06F 16/2455* (2019.01);
(Continued)

(58) Field of Classification Search
None
See application file for complete search history.

(56) References Cited

U.S. PATENT DOCUMENTS

| | | | |
|---|---|---|---|
| 2004/0249712 A1* | 12/2004 | Brown | G06Q 30/02 705/14.19 |
| 2007/0214037 A1* | 9/2007 | Shubert | G06Q 20/02 705/7.32 |

(Continued)

FOREIGN PATENT DOCUMENTS

| | | |
|---|---|---|
| WO | 2011146054 A1 | 11/2011 |
| WO | 2015147748 A1 | 10/2015 |

OTHER PUBLICATIONS

Pengcheng Wu, Steven C.H. Hoi, Hao Xia, Peilin Zhao, Dayong Wang, Chunyan Miao, "Online Multimodal Deep Similarity Learning with Application to Image Retrieval", in Proceedings of the 21st ACM international conference on Multimedia, pp. 153-162, 2013.

(Continued)

*Primary Examiner* — Matthew T Sittner

(57) ABSTRACT

A computerized reward mechanism system is proposed which makes use both of presently collected data relating to the customer, and a database of historical data relating to the customer. Using this information, the system performs a customer preference analysis, which results in selecting rewards which are adapted to the customers' personal needs. In one form, the system is positioned at a shopping center, and includes cameras for recognising past customers by image processing. This may be done without requiring customers to participate in a process of signing up to use the system. The presently collected data include responses to (Continued)

questions put to the customer relating to his present shopping experience. Customer honesty is considered in the step of determining which rewards to offer the consumer, to encourage the consumers to express their feelings more clearly.

10 Claims, 2 Drawing Sheets

(51) Int. Cl.
*G06F 16/22* (2019.01)
*G06F 16/2455* (2019.01)
*G06K 9/00* (2006.01)
*H04L 29/08* (2006.01)

(52) U.S. Cl.
CPC ......... *G06K 9/00335* (2013.01); *G06Q 30/02* (2013.01); *H04L 67/18* (2013.01); *G06K 9/00288* (2013.01)

(56) References Cited

U.S. PATENT DOCUMENTS

| | | | | |
|---|---|---|---|---|
| 2009/0083122 | A1* | 3/2009 | Angell | G06Q 10/0631 705/7.33 |
| 2009/0240571 | A1* | 9/2009 | Bonner | H04W 4/029 705/27.1 |
| 2012/0046044 | A1* | 2/2012 | Jamtgaard | H04W 4/029 455/456.1 |
| 2012/0150606 | A1* | 6/2012 | Navar | G06Q 20/3829 705/14.25 |
| 2012/0239504 | A1* | 9/2012 | Curlander | G06Q 30/02 705/14.66 |
| 2012/0253905 | A1* | 10/2012 | Darragh | G06Q 30/00 705/14.19 |
| 2012/0265637 | A1* | 10/2012 | Moeggenberg | G06Q 30/02 705/26.8 |
| 2012/0323662 | A1* | 12/2012 | Otto | G06N 5/025 705/14.25 |
| 2013/0124361 | A1* | 5/2013 | Bryson | G06Q 30/02 705/26.7 |
| 2013/0218721 | A1* | 8/2013 | Borhan | G06Q 20/322 705/26.41 |
| 2014/0089399 | A1* | 3/2014 | Chun | G06Q 50/01 709/204 |
| 2015/0012426 | A1* | 1/2015 | Purves | G06Q 30/0623 705/41 |
| 2015/0112826 | A1* | 4/2015 | Crutchfield, Jr. | G06Q 30/0601 705/26.1 |
| 2017/0140409 | A1* | 5/2017 | Liu | G06Q 30/02 |

OTHER PUBLICATIONS

Jialei Wang, Peilin Zhao, Steven C.H. Hoi, and Rong Jin, "Online Feature Selection and Its Applications", IEEE Transactions on Knowledge and Data Engineering (TKDE), 2013.
Y. Koren. "Collaborative recommendation". In Proceedings KDD'09, pp. 195-202, 2009.
Y. Koren, R. Bell, and C. Volinsky. Matrix factorization techniques for recommender system. Computer, 42(8):30-37, 2009.
Foreign Communication from a Related Counterpart Application, International Search Report and Written Opinion dated Jun. 2, 2015, International Application No. PCT/SG2015/000093 filed on Mar. 25, 2015.

* cited by examiner

COMPUTERIZED METHOD AND SYSTEM FOR AUTOMATING REWARDS TO CUSTOMERS

CROSS-REFERENCE TO RELATED APPLICATIONS

This application is a filing under 35 U.S.C. 371 as the National Stage of International Application No. PCT/SG2015/000093, filed Mar. 25, 2015 and entitled "COMPUTERIZED METHOD AND SYSTEM FOR AUTOMATING REWARDS TO CUSTOMERS," which claims the benefit of and priority to U.S. Provisional Patent Application No. 61/970,019, filed Mar. 25, 2014 both of which are incorporated herein by reference in their entirety for all purposes.

FIELD OF THE INVENTION

The present invention relates to automated methods and systems for selecting which of a plurality of rewards to offer to a customer of at least one retailer, which may be an individual or a commercial organisation.

BACKGROUND OF THE INVENTION

There is a long tradition of retailers providing their customers with rewards to encourage them to place an order with the retailer, or encourage them use the retailer again. One traditional reward mechanism is to allow customers to accumulate points to earn goods. A loyalty program is a typical example [1]. The customers are provided with a particular type of card (e.g., a loyalty card, a rewards card, a point card, an advantage card, or a club card), often with barcodes or magstripes on them. By presenting the cards, the customers can enjoy either a discount on the current purchase, or accumulate points that can be used for future purchases. An alternative is to provide customers with "one-time" rewards, such as giving the customers gifts or vouchers, or entering the customers into a lucky draw From the retailer's point of view, the rewarding mechanisms can encourage the customers to conduct more shopping, and thus raise the retailer's profits. For example, although the customers can use the points to redeem products, or enjoy discounts, the point accumulation needs a long-term shopping period, so it only will not have significant costs to the retailer if the customers use the retailers repeatedly over that period. For the one-time rewards, e.g., a lucky draw, the customers need to spend a minimum amount of money to get the reward.

Although customers do benefit from a loyalty scheme, the behaviour needed to accumulate points requires behaviour which they have to passively accept. For example, when they have become members of a program organised by a certain retailer, they will only benefit if they go back to the same retailer for their shopping; or they have to redeem their points before a certain expiration date. Therefore, customers are often incentivized to redeem their points as soon as possible. On the other hand, one-time rewards are often less than satisfactory. The vouchers often carry conditions (e.g. they can only be used on certain products which the customers do not want to buy), or the gifts are not what they need, so customers do not feel happy when they receive vouchers or gifts that do not match their personal needs. An additional disadvantage of both reward mechanisms is that in order to participate users usually have to complete a registration process, and provide private information they may prefer not to give, such as their name, IC number and contact number.

Therefore, the existing rewarding mechanisms do not provide a great enough incentive to make existing customers more loyal, or attract new loyal customers. The major reason for this is that the traditional rewarding mechanisms are not adapted to the customers' personal needs. The uniform rewards applicable to one-time rewards do not benefit all customers, while loyalty programs make the customers feel that they are forced passively to accept behaviour dictated by the retailer, instead of being encouraged.

WO 2011/1460554 [7] proposes an automated system to accumulated customer rewards, but the system requires that the user supplies a unique identifier. The selection of a reward is made by the customer himself or herself.

SUMMARY OF THE INVENTION

The present invention aims to provide a customer rewarding mechanism which benefits the customers and encourages them to conduct more shopping.

In general terms, the invention proposes that a computerized reward mechanism system makes use both of presently collected data relating to the customer, and a database of historical data relating to the customer. Using this information, the system performs a customer preference analysis, to select one or more rewards to offer the customer (from among a set of predefined reward possibilities), which are better adapted to the customers' personal needs.

The proposed mechanism can surprise the customers, making them feel that attention has been paid to them. As a consequence, the rating for retailers may be increased and attract the customers to go back.

A method which is an embodiment of the proposed mechanism may be performed automatically (e.g. upon automatically recognising that a certain customer arrives at a geographical location associate with at least one retailer, e.g. shopping center; a surveillance system may be provided at the geographical location to do this), without an additional requirement of asking the customers to disclose their personal information, and this improves the convenience of the customers' shopping experience.

The presently collected data may include responses to questions put to the customer relating to his present shopping experience. Customer honesty is considered in the step of determining which rewards to offer the consumer, to encourage the consumers to express their feelings more clearly.

The benefits provided by preferred embodiments of the invention are bidirectional. The customers can be rewarded in a way which is appropriate to their personal preferences. Furthermore, since they are rewarded also for truthfully presenting their feelings and preferences, the retailers can improve their service through analyzing the truthfully presented feelings and preferences from the customers. At the same time, more customers can be attracted through customer referral [2].

The term "automatically" is used in this document to mean a process substantially without human involvement, except with regards to setting up a system to perform the automatic process.

BRIEF DESCRIPTION OF THE DRAWINGS

A non-limited example of the invention will now be described for the sake of example only with reference to the following figures, in which.

DETAILED DESCRIPTION OF THE EMBODIMENT

Figure 1:
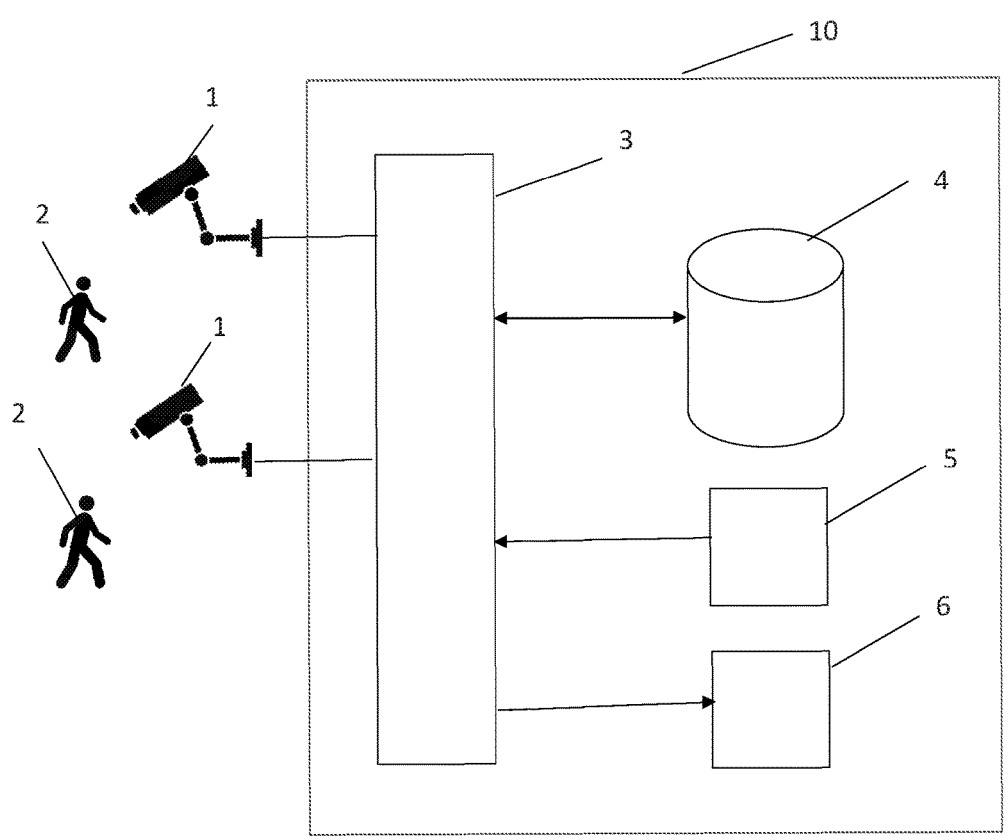
FIG. 1 is a view of a system which is an embodiment of the method.
Figure 2:
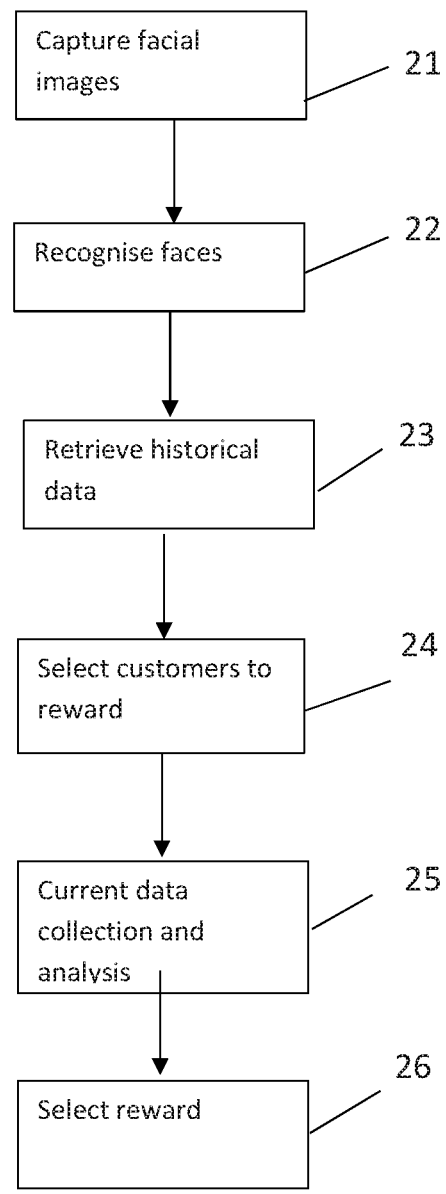
FIG. 2 is a flow diagram of the method performed by the embodiment.

FIG. 1 shows schematically a system which is an embodiment of the invention. FIG. 2 shows the steps of the method. The system employs one or more security cameras 1 which are positioned at entrances to a shopping center. When customers 2 enter the shopping center, images of their faces are captured (step 21), and the images are sent to a computational system 10 having a processor 3 which is able to access a database 4 containing a plurality of customer records, each relating to a respective previous customer. Each customer record contains both one or more previously captured images of the customer and historical data relating to that customer 2, e.g. shopping records and a user profile. Using the database, the processor 3 performs a facial recognition algorithm [3, 4] to try to identify the customers 2 among the previous customers (step 22), to associate one of the customer records with a customer 2 entering the shopping center.

If a customer 2 is not recognised in step 22, a new customer record is generated. One or more images of the customer 2 captured by the camera 2 are entered into the customer records. The historical data section of the customer record is populated as the customer shops in the shopping center.

Conversely, if a customer 2 is recognised in step 22, the historical data relating to that customer is extracted from the database (step 23); during the rest of the method below any new information which is generated relating to the customer is added to the historical data in the customer profile in the database 4.

In step 24, the historical data for the recognised customers 2 is used to select customers to reward.

In step 25, the system generates further data characterizing the current behaviour of the customers 2 (i.e. behaviour after the customer 2 has entered the geographical location). For example, the security cameras 1 may record where in the shopping center the customers 2 go. Furthermore, if the customers 2 make a purchase, the details of the purchase are collected. Additionally, the customer 2 may be asked questions regarding their shopping experience, and that data input to the processor 3 using the interface 5. Emotional information can be inferred from the customer's shopping experience. The reward amount may be partially determined by the customer's emotion. For example, when the customer is in a low emotion (i.e. a bad mood), a slightly higher reward can be provided to him.

In step 26, the data characterizing the current behaviour of the customers 2, and the historical data relating to those customers, is used to determine at least one reward to be offered to the customers 2 selected in step 24. These reward(s) may be selected from a predetermined database of rewards. Optionally, a plurality of rewards may be selected and offered, from which the user can select at least one. The rewards can be in a form such as personalized gifts or vouchers. For example, if a certain customer often buys cosmetics of a particular brand, then samples of the latest products from this brand can be provided to the customer as rewards. If the data characterizing the current behaviour of the customer shows that the customer has spent time in an area of the shopping center where certain goods are sold, e.g. an area of where children's clothes are displayed, then some vouchers to buy children's clothes can be provided to the customer as rewards. The techniques from the user preference analysis in recommendation systems [5][6] can be applied to make customers prefer the rewards.

The embodiment explained above can be applied in the environment of a real shopping center to provide the customers 2 with rewards matching their preferences.

A second embodiment of the invention is adapted instead for use in an e-commerce environment, in which customers operating respective computer systems communicate (e.g. over the internet) with an e-Commerce website. The method of this embodiment is that same as that of FIG. 2, except that steps 21 and 22 are replaced by a user login process. In this embodiment, step 25 may include collating information about which webpages in the online store the user views, and/or which search terms he or she uses. It may further include asking the consumer questions about his or her shopping experience.

Both forms of the embodiment make it possible to provide rewards which depend upon customer preferences. By providing such kind of rewards, the customers will feel surprised and be encouraged to go back more often. Hence, such rewards will provide customers with a more convenient and enjoyable shopping experience, as well as benefit the product providers by helping them to sell more products.

REFERENCES

The disclosure of the following references is incorporated herein in its entirety.

[1] Glossary L, "Loyalty Program". Electronic Merchant Systems. Aug. 18, 2011. K. Merrick.

[2] Fred Reichheld, Loyalty Rules!, Harvard Business School Press, Boston, 2001.

[3] Pengcheng Wu, Steven C. H. Hoi, Hao Xia, Peilin Zhao, Dayong Wang, Chunyan Miao, "Online Multimodal Deep Similarity Learning with Application to Image Retrieval", in Proceedings of the 21st ACM international conference on Multimedia, pp. 153-162, 2013.

[4] Jialei Wang, Peilin Zhao, Steven C. H. Hoi, and Rong Jin, "Online Feature Selection and Its Applications", IEEE Transactions on Knowledge and Data Engineering (TKDE), 2013.

[5] Y. Koren. "Collaborative recommendation". In Proceedings KDD'09, pp. 195-202, 2009.

[6] Y. Koren, R. Bell, and C. Volinsky. Matrix factorization techniques for recommender system. Computer, 42(8):30-37, 2009.

[7] WO 2011/146054, "Improved customer reward systems and methods".

The invention claimed is:

1. A computer system comprising:
  a computer processor;
  an interface; and
  a data storage device, the data storage device storing:
    for each of a plurality of customers a profile comprising historic data indicating a history of interaction with at least one retailer, and
    program instructions operative to cause the processor:
      to recognise that a customer is interacting with the at least one retailer;
      to determine if the recognised customer is associated with one of the plurality of profiles stored in the data storage device;
      to extract from the data storage device the historic data for the recognised customer if it is determined that the recognised customer is associated with one of the profiles stored in the data storage device;

to receive current data describing the present behaviour of the recognised customer and current data regarding a current shopping experience with the at least one retailer entered by the recognised customer via the interface;

to determine a current emotional state of the recognised customer during the current shopping experience based on the current data regarding the current shopping experience with the at least one retailer entered by the recognised customer via the interface; and to use (i) the historic data, (ii) the current data describing the present behaviour of the recognised customer, (iii) the current emotional state of the recognised customer, and (iv) customer honesty associated with the current data regarding the current shopping experience and the current emotional state of the recognised customer to select, from among a predefined plurality of rewards, and provide a reward to be presented to the recognised customer.

2. A computer system according to claim 1, further comprising one or more cameras arranged to capture an image of the customer if the customer is in a geographical location associated with the at least one retailer, the profile further storing at least one stored image of each of the customers, the program instructions causing the processor to recognise that the customer is interacting with the at least one retailer by performing an image recognition process on an image captured by the one of more cameras using the stored images.

3. A computer system according to claim 1, wherein the program instructions are further operative to cause the processor to register the current data entered via the interface, to indicate the answers given by the said customer to questions.

4. The system of claim 2, wherein the one or more cameras record images indicating where in a shopping center associated with the at least one retailer the recognised customer goes, and wherein the current data describing the present behaviour of the recognised customer is based on the recorded images.

5. The system of claim 1, wherein the recognised customer is determined to be not associated with one of the plurality of profiles in the data storage device, the processor is configured to generate a new profile associated with the recognised customer, the new profile comprises data associated with an interaction of the recognised customer with the at least one retailer, wherein the new profile is stored in the data storage device to serve as the historic data for the recognised customer in a repeat visit.

6. A method for rewarding a customer of at least one retailer, the method comprising:

(a) to recognise that a said customer is interacting with the at least one retailer;

(b) to access a database which stores, for each of a plurality of customers a profile comprising historic data indicating a history of interaction of a respective customer with the at least one retailer;

(c) to determine if the recognised customer is associated with one of the plurality of profiles in the database;

(d) to extract from the database the historic data for the recognised customer if the recognised customer is associated with one of the plurality of profiles in the database;

(e) to receive current data from the customer comprising data describing the present behaviour of the recognised customer and current data regarding a current shopping experience with the at least one retailer entered by the recognised customer via the interface;

(f) to determine a current emotional state of the recognised customer during the current shopping experience based on the current data regarding the current shopping experience with the at least one retailer entered by the recognised customer via the interface;

(g) to use (i) the historic data, (ii) the current data describing the present behaviour of the recognised customer, (iii) the current emotional state of the recognised customer, and (iv) customer honesty associated with the current data regarding the current shopping experience and the current emotional state of the recognised customer to select, from among a predefined plurality of rewards, a reward to be presented to the customer; and (h) to provide the selected reward to the recognised customer.

7. A method according to claim 6, further comprising capturing an image of the customers using one or more cameras arranged to capture an image of the customer if the customer is in a geographical location associated with the at least one retailer, the profile further comprising at least one stored image of each of the customers, step (a) being performed by performing an image recognition process on an image captured by the one or more cameras using the stored images.

8. A method according to claim 6, further comprising a step of using the historic data for the customer to determine whether or not to provide a reward to the recognised customer.

9. A method according to claim 6, wherein the current data comprises data indicating a region of the geographical location associated with a type of product, step (g) being performed to select a reward which is a product of said type.

10. The method of claim 6, wherein the recognised customer is determined to be not associated with one of the plurality of profiles in the database, further comprises generating a new profile associated with the recognised customer, the new profile comprises data associated with an interaction of the recognised customer with the at least one retailer, wherein the new profile is stored in the database to serve as the historic data for the recognised customer in a repeat visit.

\* \* \* \* \*